United States Patent Office 3,314,136
Patented Apr. 18, 1967

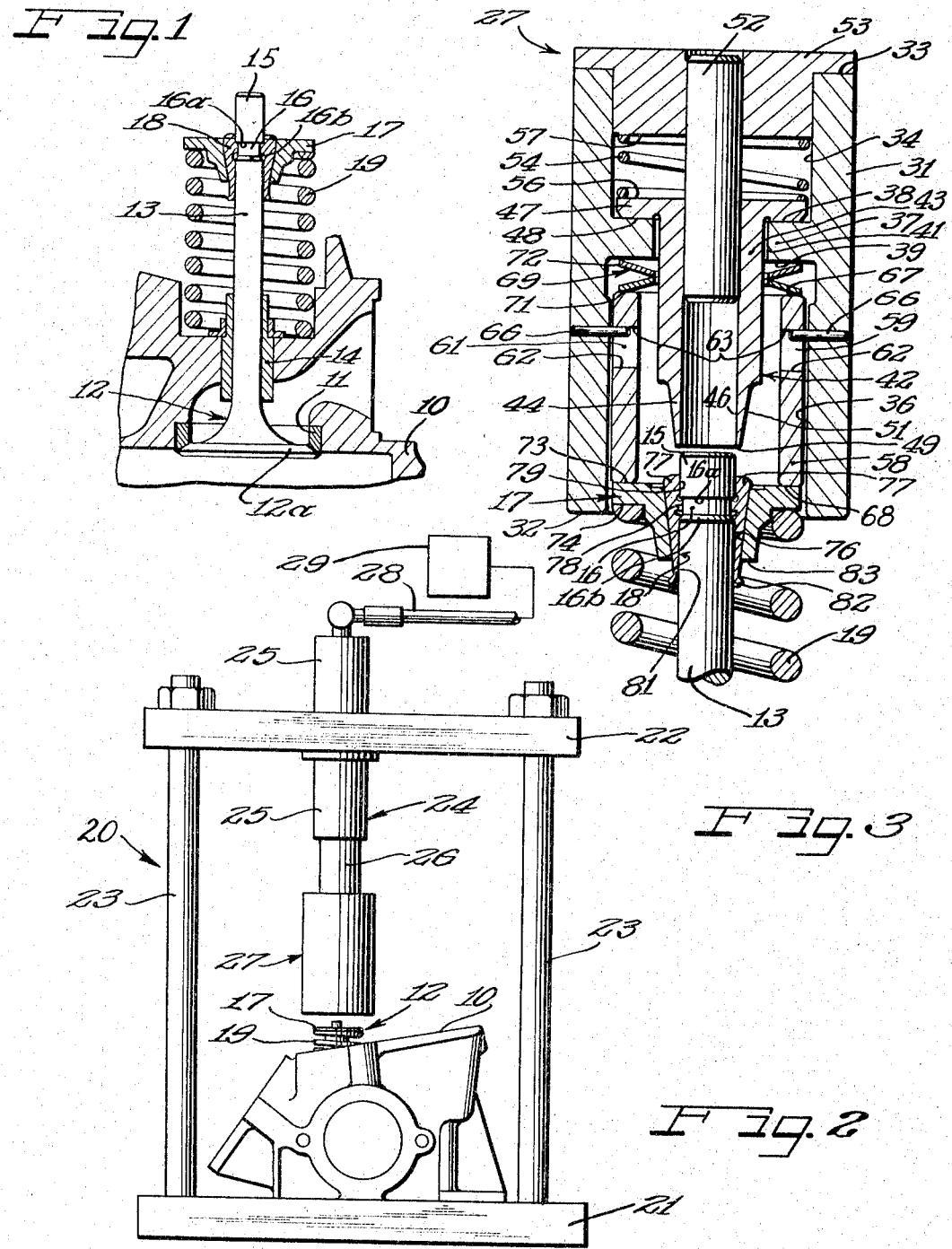

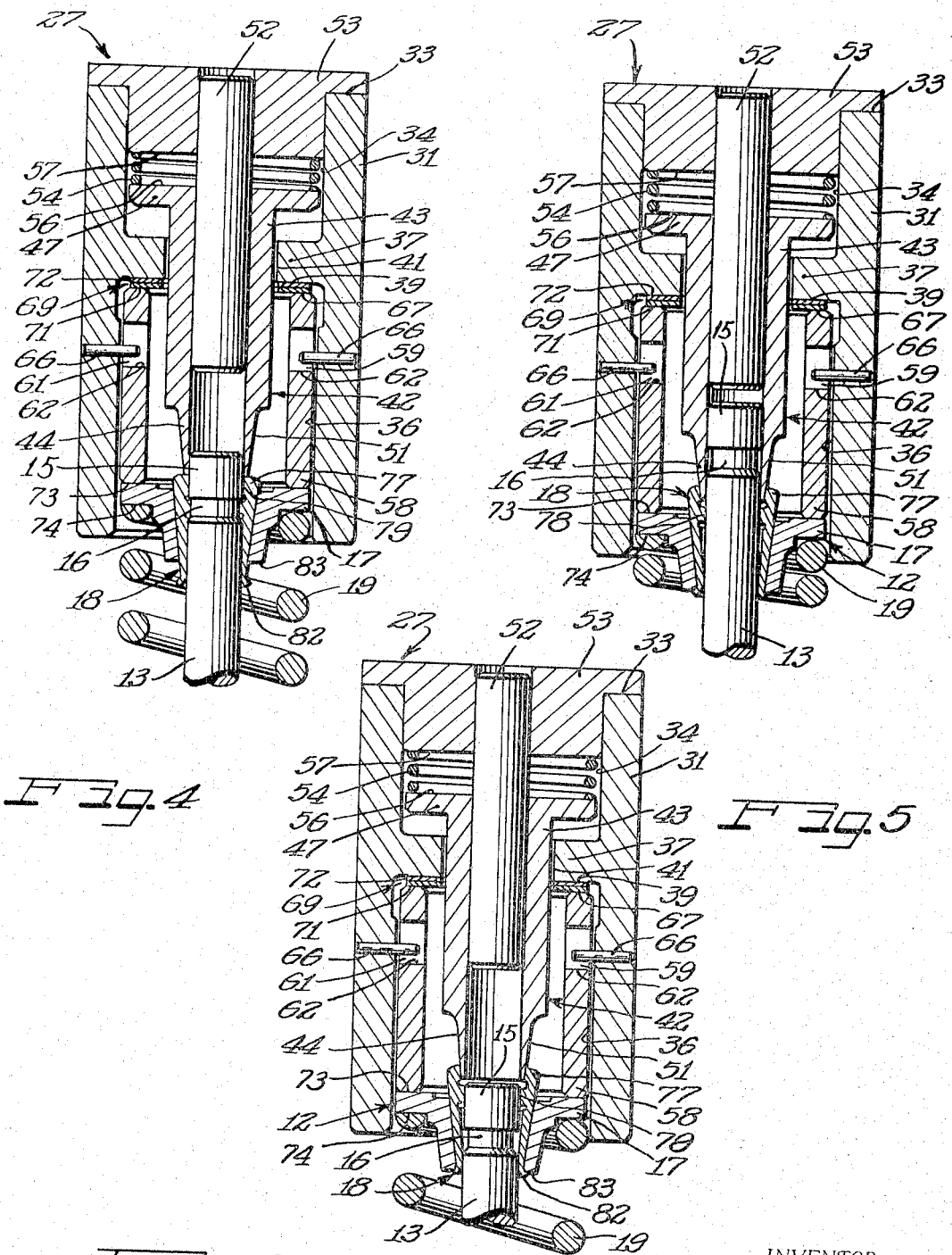

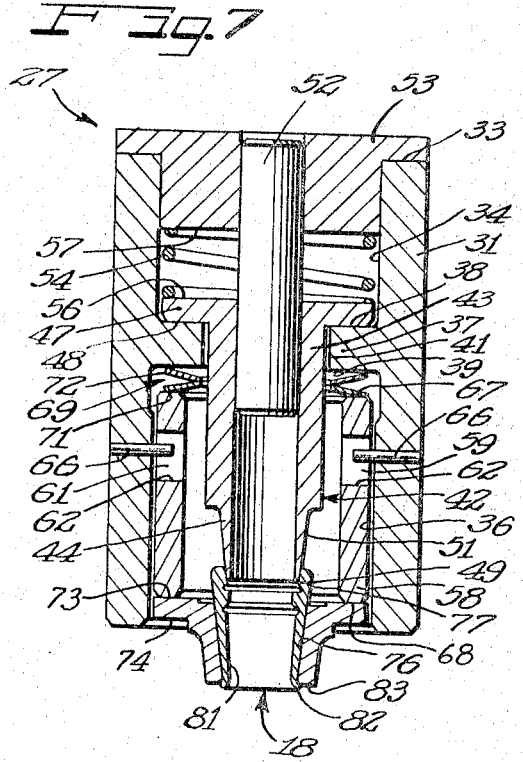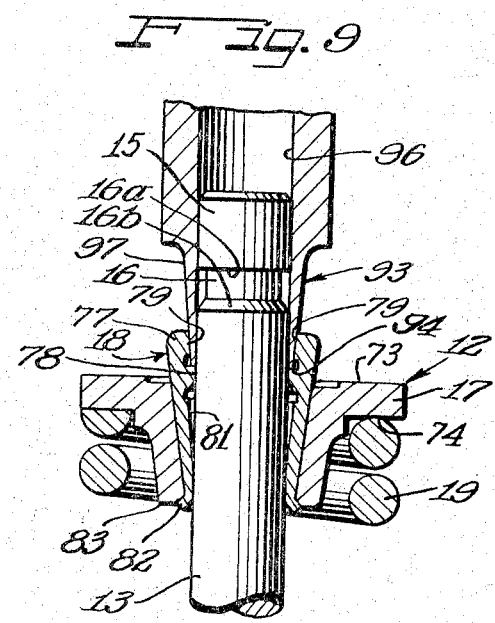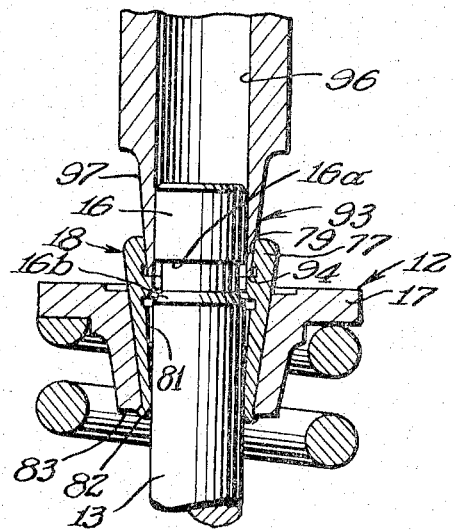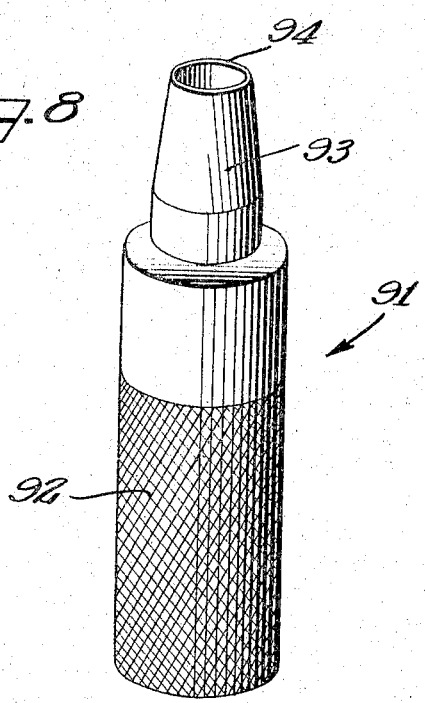

3,314,136
COLLET LOCK REMOVAL TOOLS
William S. Giles, Highland Heights, Ohio, assignor to TRW Inc., a corporation of Ohio
Filed Aug. 5, 1964, Ser. No. 387,591
11 Claims. (Cl. 29—249)

This invention generally relates to valve stem retainer lock tools and more particularly relates to automatic and manual valve stem retainer lock tools that will frictionally engage the spread fingers or segments of a retainer lock for removal of the lock from the valve stem.

In conventional engine poppet valve assemblies, the tip end of the poppet valve stem has a spring retainer locked thereon to form the bottoming means for the valve closing spring. For this purpose the stem is provided with a peripheral groove near its tip end for receiving the ribs or beads of a valve spring retainer lock. The lock may be a one-piece tubular lock that is wedge tapered and has a plurality of expandible and contractible fingers which are internally ribbed. The lock when positioned around the valve stem has a wedge fit in the tapered bore of the valve retainer with the locking ribs or beads projecting within the valve stem groove. The tools of this invention are especially suited for unlocking a retainer assembly having this type of one-piece tubular lock by providing means for frictionally engaging the expanded portion of the retainer lock and disengaging the retainer lock from the valve stem.

Therefore, it is an object of the present invention to provide an automatic retainer assembly removal tool.

It is another object of the present invention to provide an automatic retainer assembly removal tool which has means to expand a retainer lock and means to frictionally engage the expanded retainer lock to remove said lock from engagement with a valve stem.

It is still another object of the present invention to provide an automatic retainer assembly removal tool having a valve retainer depression means to move the valve spring retainer towards the valve head and thereby disengage the valve lock beads from the valve stem groove and spread said valve lock expandible segments, means to automatically frictionally engage the expanded lock segments, means to remove the lock and retainer from the valve stem.

It is still another object of the present invention to provide an automatic lock removing tool having a cylindrical housing with a spring mounted tubular lock engaging member within said housing and a spring retainer engaging member concentrically mounted within said housing.

It is still another object of the present invention to provide a manual retainer lock tool having a tapered lock engaging portion.

It is still another object of the present invention to provide a manual retainer lock tool having a removing portion with a tubular body having inner diameter equal to the outer diameter of the valve stem and having a slightly tapering thickness and a handle portion connected to said removal portion.

Other objects, features, and advantages of the present invention will become apparent to those skilled in the art after a careful consideration of the following description taken in conjunction with the drawings wherein like reference numerals referred to like in corresponding parts.

In the drawings:

FIGURE 1 is a partial longitudinal cross-sectional view with parts in elevation of a poppet valve assembly equipped with a spring retainer and lock assembly;

FIGURE 2 is a schematic elevational view of a spring retainer and lock assembly removal tool that is constructed in accordance with the principles of the present invention and being positioned adjacent an engine cylinder head.

FIGURE 3 is a partial longitudinal cross-sectional view with parts in elevation of an automatic retainer and lock assembly removal tool constructed in accordance with the principles of the present invention and being in the initial position of its removing operation with regards to a poppet valve assembly;

FIGURE 4 is a partial longitudinal cross-sectional view with parts in elevation of an automatic retainer and lock assembly removal tool constructed in accordance with the principles of the present invention and being in one of its removing positions with regard to a poppet valve assembly;

FIGURE 5 is a partial longitudinal cross-sectional view with parts in elevation of an automatic retainer and lock assembly removal tool constructed in accordance with the principles of the present invention and being in another progressive removing position with regards to a poppet valve assembly;

FIGURE 6 is a partial longitudinal cross-sectional view with parts in elevation of an automatic retainer and lock assembly removal tool constructed in accordance with the principles of the present invention and being in still another progressive removing position with regards to a poppet valve assembly;

FIGURE 7 is a partial longitudinal cross-sectional view with parts in elevation of an automatic retainer and lock assembly removal tool constructed in accordance with the principles of the present invention and being in the next to the final position of its removing operation with regards to a poppet valve spring retainer assembly;

FIGURE 8 is an elevational view of a manual collet removal tool constructed in accordance with the principles of the present invention;

FIGURE 9 is a partial longitudinal cross-sectional view with parts in elevation of the manual collet removal tool constructed in accordance with the principles of the present invention and positioned in cooperation with a poppet valve assembly; and FIGURE 10 is a partial longitudinal cross-sectional view with parts in elevation of the manual collet removal tool constructed in accordance with the principles of the present invention and being in another collet removal position.

As shown in the drawings:

Referring to FIGURE 1, reference numeral 10 generally indicates an engine part such as for example a portion of the cylinder head of an internal combustion engine.

Seated within an appropriate recess in the cylinder head 10 is an annular valve seat 11 composed of a material capable of withstanding high-temperature and corrosion conditions which the valve assembly is subjected to. A valve assembly 12 having a poppet valve 12a seated against the valve seat 11 and has a rod-like stem portion 13 slidably received within a valve stem guide 14. The tip end 15 of the stem 13 has a conventional annular retainer lock groove 16 having a flat annular top wall 16a and a frusto-conical of chamfered bottom wall 16b diverging towards the valve 12. A tubular valve spring retainer 17 surrounds and is locked to the valve stem 13 by a retainer lock or collet 18. A coil valve spring 19 surrounds the stem 13 and has one end bottomed against the retainer 17 and the opposite end bottomed against a seat in the cylinder head 10. The valve spring 19 holds the valve 12 in its closed position.

Referring to FIGURE 2, a press 20 has a base support 21 and an overhead support 22 interconnected by upright supports 23 and a ram 24 suitably affixed to the upper support 22. The ram 24 comprises a fluid cylinder 25 extending both outwardly and inwardly from the press overhead support 22. A cylinder or piston 26 is slidably axially movable within the fluid cylinder 25 by pressurized fluid fed through the inlet conduit 28 suitably connected to a pressurized fluid supply 29. The piston 26 is suitably attached to an automatic collet or spring retainer lock or spring retainer assembly removal tool 27.

A cylidner head 10 is positioned under the fluid actuated ram 24 with the collet or retainer assembly removal tool 27 located above the valve assembly 12 which requires disassembly from the cylinder head. By actuating the ram, the retainer assembly is removed from the valve stem as will hereinafter be described in greater detail.

It is of course understood that although the press is shown as providing a single station ram 24, multiple rams may be utilized to disassemble more than one or all the valve assemblies from the cylinder head in one stroke.

Referring to FIGURE 3, the collet lock removal tool 27 comprises a cylindrical pilot sleeve 31 having an annular top end wall 32 and an annular bottom end wall 33. An annular radially inwardly extending shoulder 37 divides an inner portion of the pilot sleeve 31 into an upper wall portion 34 and a lower wall portion 36. The shoulder 37 has a top face 38 and a bottom face 39 and forms a cylindrical passage 41 concentric with the pilot sleeve internal walls 34 and 36.

A tubular taper lock engaging plug 42 is slidably connected within the pilot sleeve 31. The plug 42 has a cylindrical axial bore 46 formed therethrough and has a cylindrical top portion 43 and a tapered lock engaging bottom portion 44. The plug top portion 43 has a flaring or flanged end wall 47 which has a shoulder 48. The upper portion has an outer diameter which is smaller than the diameter of the passage 41 such that the plug 42 passes therethrough with the shoulder 48 sitting on the shoulder outer wall 38 and the plug bottom portion 44 projecting within the pilot sleeve bottom portion 36. The plug bottom portion 44 has a mouth 49 and an external tapered wall 51 such that the plug bottom portion 44 increases in thickness from the mouth 49 to the upper portion 43.

The taper plug 42 is substantially concentrically and axially aligned within the pilot sleeve 31 by a guide rod 52 affixed to an end cap 53 and projecting inwardly into the pilot sleeve for a predetermined distance. The guide rod 52 has a diameter slightly less than the diameter of the taper plub bore 46 and projects from the cap 53 into the taper plug bore 46 to guide the axial movement of the taper plug. The guide end cap 53 is suitably attached to the pilot sleeve top end wall 32 and has means thereon (not shown) for suitably attaching the retainer assembly remover 27 to the plunger piston 26 (FIGURE 2).

A coil plug advance spring 54 surrounds the guide rod 52 and has one end bottomed on the taper plug annular end wall 56 and the other end bottom on the cap inner end wall 57. The plug advance spring normally urges the plug 42 against the pilot sleeve shoulder 37 as is illustrated in FIGURE 3.

A cylindrical ejector sleeve 58 is slidably mounted within the pilot sleeve lower portion 36 and has an outer diameter less than the diameter of the lower portion wall 36 and an inner diameter larger than the outer diameter of the tubular plug upper portion 43. The ejector sleeve is provided with a pair of axially extending slots 59 and 61 which are preferably radially aligned and diametrically opposed to each other. The slots 59 and 61 have spaced stop walls 62 and 63. The stop walls 62 and 63 are utilized to cooperate with a pair of stop pins 64 and 66 which extend radially inwardly into the pilot sleeve bottom portion and through the slots 59 and 61 respectively to maintain proper axial orientation of the ejector sleeve. The ejector sleeve has a top annular end wall 67 and a bottom annular end wall 68 with an annular leaf ejector spring 69 having one end 71 in contact with the ejector sleeve annular end 67 and another end 72 in contact with the pilot sleeve shoulder bottom wall 39. The ejector spring 69 urges the ejector sleeve towards the pilot sleeve bottom end wall 33 and maintains the stop wall 63 in contact with the respective stop pins 64 and 66 when not in operation.

The pilot sleeve lower portion 36 has an inner diameter larger than the outer diameter of the retainer 17 such that the retainer will freely slide therein. The retainer 17 has an annular top surface 73 having an annulus sized for engagement with the ejector sleeve annular bottom end wall 68 and an annular bottom surface shoulder 74 sized for engagement with one end of the coil valve spring 19. The retainer has a frusto-conical or tapered bore 76 formed therethrough for accommodating the collet or retainer lock 18. The retainer lock 18 is preferably a tubular one-piece lock having a plurality of expandible and contractible fingers or segments 77 that have beads or ribs 78 radially projecting inwardly from the cylindrical bore thereof and tapered outer surfaces to form a wedge fit with the retainer bore 76 as is shown in FIGURE 3. The collet cylindrical bore has outboard stem engaging surfaces 79 on one side of the ribs and inboard stem engaging surfaces 81 on the other side of the ribs 78. The retainer lock is axially movable within the retainer and is suitably attached thereto by its outturned lip 82.

In operation, the cylinder head 10 is placed in position under the retainer assembly removal tool 27. The ram 24 is actuated and the removal tool 27 is urged down towards the retainer 17 and placed in the position illustrated in FIGURE 3 with the ejector sleeve annular bottom end wall 68 abutting the retainer surface 73. Then, as in FIGURE 4, continued actuation of the ram 24 causes the ejector sleeve 58 to move upwardly and compress the ejector spring 69 and place the taper plug mouth 49 in contact with the end of the collet segments 77. The hollow plug has its internal bore 46 slightly larger in diameter than the valve stem 13 such that the valve stem may pass therethrough. Therefore, in this position the advance spring 54 is compressed with the shoulder 48 raised off the pilot sleeve shoulder surface 38 and the advanced spring, in its compressed position, is urging the plug 42 towards the lock 18.

Referring to FIGURE 5, as the injector assembly 27 is continuously moved toward the cylinder head 10, the force exerted by ejector sleeve 58 overcomes the valve spring force and the ejector sleeve urges until its bottom annular wall 83 abuts the collet lip 82. Then the retainer and lock are simultaneously moved downward such that the beads or ribs 78 contact the valve stem chamfer groove face 16b which causes the flexible segments or fingers 77 to expand and place the ribs 78 in contact with the stem walls 13 with the lock finger outboard surfaces 79 spaced radially outwardly from the valve stem 13. Once the segmented fingers are separated from the valve stem surfaces, the advance spring 54 urges the taper plug bottom portion 44 downwardly between the valve stem and the outboard surfaces 79. The bottom plug portion 44 has an external taper of a locking nature such that it will frictionally grip the outboard surfaces 79 to prevent slip between the plug and the lock 17 as the pressure of the valve spring 19 is reduced. Further, when the botom taper portion of the plug 42 is in locking relationship with the outboard surfaces 79, as illustrated in FIGURE 5, the internal tapering bore 76 of the retainer 17 aids in providing the frictional locking between the plug bottom portion 44 and the lock 17.

Now, referring to FIGURE 6, the ram 24 is retracted and the valve spring compression thereby eased. The extended or expanded collet fingers are slipped over the valve stem groove 16 and along the valve stem 13 with the taper plug bottom portion retaining the collet segments in their extended position to prevent the engagement of the lock ribs 78 with the grove 16. The load by the valve spring 19 causes the retainer and lock to slide along the valve stem as the removal tool stroke is reversed. The ejector spring 69 and the advance spring 54 both remain in their compressed positions until the load of the valve spring 19 drops below the combined load of the advance spring and the ejector spring.

FIGURE 7 illustrates the retainer assembly removal tool in a position where it is approaching the end of the ram return stroke. The lock 18 has been removed from the valve stem 13 and the load from the valve spring 19 is removed. The advance spring 54 has forced the plug shoulder 48 against the pilot sleeve shoulder wall 38 to prevent further downward axial travel thereof and the ejector spring 69 is partially deflected or compressed at this point. The next step is the ejector spring 69 expanding to cause the ejector sleeve 58 to axially advance relative to the plug 42 and thereby removing the lock and retainer assembly from the plug bottom portion 44.

The above automatic removal tool provides with one device the simplified operation of spring compression, collet extension and retension, and subsequent ejection of a lock assembly. Such a tool provides rapid cylinder head disassembly along with the handling of a minimum number of tools and parts.

Referring to FIGURE 8 there is illustrated a manual retainer assembly disassemblying tool 91 having a cylindrical handle portion 92 and a reduced diameter tubular collet grasping portion 93 projecting axially from said handle portion. The collet grasping portion has a mouth 94. The tool has a cylindrical chamber 96 extending inwardly a predetermined distance from the mouth 94, and the chamber 96 has a diameter slightly larger than the diameter of the valve stem it is adapted to be utilized with. The collet grasping portion 93 has a tapered external surface 97 formed by having the collet portion 93 gradually increasing in thickness from the mouth 94 to the handle portion 92.

Referring to FIGURES 9 and 10, the tool 91 is utilized with a valve spring retainer assembly 12 having a retainer 17 and a tubular one-piece lock 18. The lock 18 has expandible and contractible fingers 77 with ribs 78 projecting radially inwardly therefrom and having outboard and inboard surfaces 79 and 81 respectively which are adapted to grasp the valve stem 13 and maintain the retainer assembly in position. When it is desired to disassemble the assembly 12 from the valve stem 13, the retainer 17 is urged downwardly by a hand compression tool to compress the valve spring 19 and to cause the lock ribs 78 to slide over the valve stem chamfered groove wall 16b to spread the lock fingers 77 as is illustrated in FIGURE 9. Then, the hand tool is slid over the tip end 15 of the valve stem 13 with its lock engaging portion 93 being slid between the expanded fingers 77 and the valve stem. The taper on the tool portion 93 forms a locking means to prevent slip between the tool and the collet fingers outboard surface 79. As the load compressing the valve spring 19 is removed, the tool removal portion 93 maintain the collet fingers 77 in their extended position whereby the ribs 78 are prevented from extending within the stem groove 16, as is illustrated in FIGURE 10.

Therefore, it is seen where I have provided a tool for effectively engaging and removing spring retainer assemblies from poppet valves.

Although the above invention was described in accordance with the preferred embodiments thereof, it is apparent that modifications and variations may be effected without departing from the scope of the novel concepts of the present invention and it will be understood that I intend that this invention be limited only by the scope of the hereunto appended claims.

I claim as my invention:

1. A power operated retainer assembly removal tool comprising:
   a pilot sleeve having an open end and a closed end,
   a plug having a lower collet engaging portion,
   said plug being axially slidably mounted within said pilot sleeve with said lower portion facing the sleeve open end,
   said plug tubular lower portion having means to removably engage a retainer collet,
   a spring means in said pilot sleeve in contact with the plug to urge the plug lower portion towards the pilot sleeve open end with a predetermined force,
   an ejector axially slidably mounted in the pilot sleeve,
   means within the pilot sleeve to limit the axial movement of the ejector,
   said ejector being adapted to abut a valve spring retainer,
   an ejector spring means mounted in the pilot sleeve in contact with the ejector to urge the ejector toward the pilot sleeve open end.

2. A power operated retainer assembly removal tool comprising:
   a sleeve having an open end and a closed end,
   a collet grasping plug having a lower collet engaging portion,
   said plug being slidably mounted within said sleeve with said lower portion facing the sleeve open end,
   said plug lower portion having means to removably engage a retainer collet,
   guide means connected to said sleeve and plug to guide the axial movement of said tubular plug,
   a spring means in contact with the plug to urge the plug towards the sleeve open end with a predetermined force,
   an ejector axially slidably connected to the sleeve and being sized to abut a portion of a spring retainer assembly,
   stop means connected to the sleeve and the ejector to limit the axial movement of the ejector, and
   an ejector spring means connected to the ejector to urge the ejector towards the sleeve open end with a predetermined force.

3. A power operated retainer assembly removal tool comprising:
   a pilot sleeve having an open end and a closed end,
   a plug having a lower collet engaging portion,
   said plug being axially slidably mounted within said pilot sleeve with said lower portion facing the sleeve open end,
   said plug lower portion having means to removably engage a retainer collet,
   guide means connected to said plug to guide the axial movement of said plug within the pilot sleeve,
   a spring means in said pilot sleeve between the pilot sleeve closed end and the plug to urge the plug towards the pilot sleeve open end with a predetermined force,
   an ejector sleeve axially slidably mounted in the pilot sleeve and having one end adapted to abut a spring retainer,
   stop means connected to the pilot sleeve and the ejector sleeve to limit the relative axial movement of the ejector sleeve in the pilot sleeve, and
   an ejector spring means mounted in the pilot sleeve and connected to the ejector sleeve to urge the ejector sleeve toward the pilot sleeve open end with a predetermined force.

4. A power operated retainer assembly removal tool comprising:
   a cylindrical pilot sleeve having an open end and a closed end,
   a plug having a lower collet engaging portion,
   said plug being axially slidably mounted within said pilot sleeve with said lower portion facing the sleeve open end,
   said plug lower portion having means to removably engage a retainer collet,
   means closing the pilot sleeve upper end,
   guide means connected to said plug to guide the axial movement of said tubular plug, means within said pilot sleeve to limit the axial movement of said plug, an advance spring means in said pilot sleeve between the pilot sleeve closed end and the plug to urge the plug towards the pilot sleeve open end with a predetermined force, a cylindrical ejector sleeve slidably mounted in the pilot sleeve and having inner diameter greater than the diameter of the plug and less than the diameter of a spring retainer it is adapted to abut, stop means connected to the pilot sleeve and the ejector sleeve to limit the relative axial movement of the ejector sleeve in the pilot sleeve, and an ejector spring means mounted in the pilot sleeve and connected to the ejector sleeve to urge the ejector sleeve toward the pilot sleeve open end with a predetermined force.

5. A power operated retainer assembly removal tool comprising:

a cylindrical pilot sleeve having an open end and a closed end, an annular shoulder means extending radially inwardly from the inner walls of the pilot sleeve and dividing the pilot sleeve into an upper portion and a lower portion, a plug having a lower collet engaging portion, said plug having a flanged end wall slidably within said pilot sleeve upper portion and adapted to sit on said annular shoulder, said plug lower portion being slidably within said pilot sleeve lower portion and having means to removably engage a retainer collet, means closing the pilot sleeve upper end, a guide means connected to said plug to guide the axial movement of said tubular plug, an advance spring means in said pilot sleeve upper portion between the pilot sleeve closed end and the plug flanged end wall to urge the plug flanged end wall towards the pilot sleeve annular shoulder with a predetermined force, a cylindrical ejector sleeve slidably mounted in the pilot sleeve lower portion and having inner diameter greater than the diameter of the plug and less than the diameter of a spring retainer it is adapted to abut, stop means connected to the pilot sleeve and the ejector sleeve to limit the relative axial movement of the ejector sleeve in the pilot sleeve, and an ejector spring means mounted in the pilot sleeve lower portion and positioned between the ejector sleeve and the pilot sleeve shoulder to urge the ejector sleeve away from the pilot sleeve shoulder with a predetermined force.

6. A power operated retainer assembly removal tool comprising:

a cylindrical pilot sleeve, an annular protrusion extending radially inwardly from the inner walls of the pilot sleeve and dividing the pilot sleeve into an upper portion and a lower portion and forming a sleeve port, a plug being divided into a cylindrical upper portion and a lower collet engaging portion, said plug upper portion having a flanged end wall slidably mounted within said pilot sleeve upper portion and having a larger diameter than said sleeve port and said cylindrical plug upper portion slidably passing through said sleeve port, said plug lower portion being slidably mounted within said pilot sleeve lower portion and having means to removably engage a retainer collet, a cap closing the pilot sleeve upper end, guide means connected to said cap and projecting axially inwardly therefrom and connected to the plug to guide the axial movement of said tubular plug, an advance spring in said pilot sleeve upper portion surrounding said guide rod and having one end in contact with the cap and the other end in contact with the plug flanged end wall to urge the plug flanged end wall towards the pilot sleeve annular protrusion with a predetermined force, a cylindrical ejector sleeve slidably mounted in the pilot sleeve lower portion and having inner diameter greater than the diameter of the plug and less than the diameter of a spring retainer it is adapted to abut, stop means connected to the pilot sleeve and the ejector sleeve to limit the relative axial movement of the ejector sleeve in the pilot sleeve, and an ejector spring mounted in the pilot sleeve lower portion and positioned between the ejector sleeve and the pilot sleeve protrusion to urge the ejector sleeve away from the pilot sleeve protrusion with a predetermined force.

7. A power operated retainer assembly removal tool comprising:

a cylindrical pilot sleeve, an annular protrusion extending radially inwardly from the inner walls of the pilot sleeve and dividing the pilot sleeve into an upper portion and a lower portion and forming a sleeve port concentric with the pilot sleeve, a tubular plug having a cylindrical bore therethrough and being divided into a cylindrical upper portion and a lower collet engaging portion, said tubular plug upper portion having a flanged end wall slidably mounted within said pilot sleeve upper portion and having a larger diameter than said sleeve port and said cylindrical plug upper portion slidably passing through said sleeve port, said plug lower portion being slidably within said pilot sleeve lower portion and having means to removably engage a retainer collet, a cap closing the pilot sleeve upper end, a guide rod connected to said cap and projecting axially inwardly therefrom into the tubular plug port and slidably received by the tubular plug port to guide the axial movement of said tubular plug, an advance coil spring in said pilot sleeve upper portion surrounding said guide rod and having one end in contact with the cap and the other end in contact with the plug flanged end wall to urge the plug flanged end wall towards the pilot sleeve annular protrusion with a predetermined force, a cylindrical ejector sleeve slidably mounted in the pilot sleeve lower portion and having inner diameter greater than the diameter of the plug and less than the diameter of a spring retainer it is adapted to abut, stop means connected to the pilot sleeve and the ejector sleeve to limit the relative axial movement of the ejector sleeve in the pilot sleeve, and an ejector leaf spring mounted in the pilot sleeve lower portion and positioned between the ejector sleeve and the pilot sleeve protrusion to urge the ejector sleeve away from the pilot sleeve protrusion with a predetermined force.

8. A power operated removal tool for retainer assemblies having a tubular spring retainer with a tapered bore and an expansible contractible one-piece retainer lock therein, with said lock having a bore therethrough and an upper portion being divided into a plurality of arcuate expansible and contractible fingers each having a radially inwardly extending lock rib and outboard and inboard valve stem engaging surfaces and said expansible fingers being tapered externally to form a wedge fit in said retainer bore, comprising:

a housing having one end adapted to face a retainer assembly, a collet plug having a tubular lower collet outboard surface engaging portion, said plug being axially slidably mounted within said housing with said plug tubular lower portion adapted to face said retainer assembly, said plug tubular lower portion having a side wall that increases in thickness from the end thereof, said plug tubular lower portion having a diameter slightly larger than the diameter of a valve stem it is adapted to receive, said plug lower portion increasing thickness being predetermined such that the external walls thereof are capable of frictionally grasping the expanded collet outboard surfaces, a spring means in said housing in contact with the plug to urge the plug flanged end wall towards the housing one end with a predetermined force, an ejector axially slidably mounted in the housing, stop means connected to the housing to limit the relative axial movement of the ejector in the pilot sleeve, and an ejector spring mounted in the housing to urge the ejector toward the housing one end.

9. A power operated removal tool for retainer assemblies having a tubular spring retainer with a tapered bore and an expansible contractible one-piece retainer lock therein, with said lock having a bore therethrough and an upper portion being divided into a plurality of arcuate expansible and contractible fingers each having a radially inwardly extending lock rib and outboard and inboard valve stem engaging surfaces and said expansible fingers being tapered externally to form a wedge fit in said retainer bore, comprising:

a housing having one end and adapted to face a retainer assembly, a plug having a tubular lower collet engaging portion, said plug being axially slidably mounted within said housing with said plug tubular lower portion adapted to face said retainer assembly, said plug lower portion having a tapered side wall that increases in thickness from the end thereof, said plug tubular lower portion having a diameter slightly larger than the diameter of a valve stem it is adapted to receive, said plug lower portion increasing thickness being predetermined such that the external walls thereof are capable of frictionally grasping the expanded collet outboard surfaces, a guide means connected to said plug to guide the axial movement of said tubular plug, an advance spring means in said housing between the housing other end and the plug to urge the plug towards the housing open end with a predetermined force, an ejector sleeve axially slidably mounted in the housing and having one end adapted to abut a spring retainer, stop means connected to the housing and the ejector sleeve to limit the relative axial movement of the ejector sleeve in the housing, and an ejector spring means mounted in the housing and connected to the ejector sleeve to urge the ejector sleeve toward the housing open end with a predetermined force.

10. A power operated removal tool for retainer assemblies having a tubular spring retainer with a tapered bore and an expansible contractible one-piece retainer lock therein, with said lock having a bore therethrough and an upper portion being divided into a plurality of arcuate expansible and contractible fingers each having a radially inwardly extending lock rib and outboard and inboard valve stem engaging surfaces and said expansible fingers being tapered externally to form a wedge fit in said retainer bore, comprising:

a housing having one end and adapted to face a retainer assembly, an annular shoulder means extending radially inwardly from the inner walls of the housing and dividing the housing into an upper portion and a lower portion, a plug having a tubular lower collet engaging portion, said plug having a flanged end wall slidably within said housing upper portion and adapted to sit on said annular shoulder, said plug lower portion being slidably within said housing lower portion and having a tapered side wall, said plug tubular lower portion having a diameter slightly larger than the diameter of a valve stem it is adapted to receive, said plug lower portion increasing thickness being predetermined such that the external walls thereof are capable of frictionally grasping the expanded collet outboard surfaces, means closing the housing other end, a guide means connected to said plug to guide the axial movement of said tubular plug, an advance spring means in said housing upper portion between the housing other end and the plug flanged end wall to urge the plug flanged end wall towards the housing annular shoulder with a predetermined force, a cylindrical ejector sleeve slidably mounted in the housing lower portion and having inner diameter greater than the diameter of the plug and less than the diameter of a spring retainer it is adapted to abut, stop means connected to the housing and the ejector sleeve to limit the relative axial movement of the ejector sleeve in the pilot sleeve, and an ejector spring means mounted in the housing lower portion and positioned between the ejector sleeve and the housing protrusion to urge the ejector sleeve away from the housing protrusion with a predetermined force.

11. A power operated retainer assembly removal tool for retainer assemblies having a tubular spring retainer with a tapered bore and an expansible contractible one-piece retainer lock therein, with said lock having a bore therethrough and an upper portion being divided into a plurality of arcuate expansible and contractible fingers each having a radially inwardly extending lock rib and outboard and inboard valve stem engaging surfaces and said expansible fingers being tapered externally to form a wedge fit in said retainer bore, comprising:

a housing having one end and adapted to face a retainer assembly, an annular protrusion extending radially inwardly from the inner walls of the pilot sleeve and dividing the housing into an upper portion and a lower portion and forming a sleeve port concentric with the housing, a tubular plug having a cylindrical bore therethrough and being divided into a cylindrical upper portion and a lower collet engaging portion, said tubular plug upper portion having a flanged end wall slidably mounted within said housing upper portion and having a larger diameter than said sleeve port and said cylindrical plug upper portion slidably passing through said sleeve port, said plug lower portion being slidably within said housing lower portion and having a side wall that increases in thickness from the end thereof to the upper portion, said plug tubular lower portion having a diameter slightly larger than the diameter of a valve stem it is adapted to receive, said plug lower portion increasing thickness being predetermined such that the external walls thereof are capable of frictionally grasping the expanded collet outboard surfaces, a cap closing the housing other end, a guide rod connected to said cap and projecting axially inwardly therefrom into the tubular plug port and slidably received by the tubular plug port to guide the axial movement of said tubular plug, an advance coil spring in said housing upper portion surrounding said guide rod and having one end in contact with the cap and the other end in contact with the plug flanged end wall to urge the plug flanged end wall towards the housing annular protrusion with a predetermined force, a cylindrical ejector sleeve slidably mounted in the housing lower portion and having inner diameter less than the diameter of the plug and less than the diameter of a spring retainer it is adapted to abut, stop means connected to the housing and the ejector sleeve to limit the relative axial movement of the ejector sleeve in the housing, and an ejector leaf spring mounted in the housing lower portion and positioned between the ejector sleeve and the housing protrusion to urge the ejector sleeve away from the housing protrusion with a predetermined force.

References Cited by the Examiner

UNITED STATES PATENTS

| | | | |
|---|---|---|---|
| 2,434,456 | 1/1948 | Cook | 29—249 X |
| 2,742,689 | 4/1956 | Rocha | 29—249 |
| 2,943,385 | 7/1960 | Miller | 29—213 |
| 3,065,528 | 11/1962 | Marshall | 29—254 X |

FOREIGN PATENTS 976,160  11/1964  Great Britain.

WILLIAM FELDMAN, *Primary Examiner.*

M. C. DRUSE, *Examiner.*